(12) United States Patent
Watanabe et al.

(10) Patent No.: US 11,993,321 B2
(45) Date of Patent: May 28, 2024

(54) AIRFLOW ADJUSTING APPARATUS

(71) Applicant: SUBARU CORPORATION, Tokyo (JP)

(72) Inventors: Naoto Watanabe, Tokyo (JP); Yusaku Dogahira, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 407 days.

(21) Appl. No.: 17/369,540

(22) Filed: Jul. 7, 2021

(65) Prior Publication Data

US 2022/0033012 A1 Feb. 3, 2022

(30) Foreign Application Priority Data

Jul. 31, 2020 (JP) ................................. 2020-129789

(51) Int. Cl.
*B62D 35/02* (2006.01)
*B60R 16/03* (2006.01)
*F15D 1/00* (2006.01)

(52) U.S. Cl.
CPC ............ *B62D 35/02* (2013.01); *B60R 16/03* (2013.01); *F15D 1/0075* (2013.01)

(58) Field of Classification Search
CPC ....... B62D 35/00; B62D 35/005; B62D 35/02
USPC .......................................... 296/180.1, 180.2
See application file for complete search history.

(56) References Cited

U.S. PATENT DOCUMENTS

| | | | | |
|---|---|---|---|---|
| 4,180,290 A | * | 12/1979 | Drews ..................... | B62D 35/00 244/130 |
| 4,511,170 A | * | 4/1985 | Sankrithi ............. | B62D 35/008 296/180.1 |
| 9,481,409 B2 | * | 11/2016 | Reisenhofer ........... | B62D 25/20 |
| 11,136,075 B2 | * | 10/2021 | Kim ....................... | B62D 35/02 |
| 2012/0061993 A1 | | 3/2012 | Hasegawa et al. | |
| 2013/0026797 A1 | * | 1/2013 | Onodera ................ | B62D 35/02 296/204 |

(Continued)

FOREIGN PATENT DOCUMENTS

| | | | |
|---|---|---|---|
| DE | 102017200820 A1 | * | 7/2018 |
| JP | 2012-056499 A | | 3/2012 |
| JP | 2019-111965 A | | 7/2019 |

OTHER PUBLICATIONS

English translation of DE 10 2017 200 820; retrieved Oct. 17, 2023 via Patenttranslate located at www.epo.org. (Year: 2023).*

*Primary Examiner* — Jason S Daniels
(74) *Attorney, Agent, or Firm* — MCGINN I.P. LAW GROUP, PLLC

(57) ABSTRACT

An airflow adjusting apparatus to be provided in a vehicle includes a first airflow generator and a second airflow generator. The vehicle includes a front wheel and a rear wheel that are disposed in a vehicle longitudinal direction to be partly protruded from a bottom surface of a vehicle body of the vehicle downward in a vertical direction of the vehicle body. The first airflow generator is provided on the bottom surface of the vehicle body and behind the front wheel, and configured to generate a first airflow moving backward of the vehicle. The second airflow generator is provided on the bottom surface of the vehicle body and behind the first airflow generator, and configured to generate a second airflow that deflects, vehicle-widthwise inward, an airflow flowing in from a side on which the first airflow generator is disposed.

20 Claims, 7 Drawing Sheets

(56) References Cited

U.S. PATENT DOCUMENTS

2017/0057565 A1* 3/2017 Sarhadiangardabad ..................... B62D 35/02
2017/0297634 A1* 10/2017 Han ..................... H05H 1/2439
2019/0342985 A1* 11/2019 Dadheech ............ H05H 1/2439

* cited by examiner

AIRFLOW ADJUSTING APPARATUS

CROSS-REFERENCE TO RELATED APPLICATIONS

This application claims priority from Japanese Patent Application No. 2020-129789 filed on Jul. 31, 2020, the entire contents of which are hereby incorporated by reference.

BACKGROUND

The disclosure relates to an airflow adjusting apparatus that adjusts airflows between an underneath of a vehicle body of a vehicle and a road surface.

For vehicles such as a four-wheeled automobile, airflows colliding with a wheel under a vehicle body disturb a flow field of relative winds around a vehicle body, causing aggravation of, for example, air resistance, aerodynamic noise, and aerodynamic vibration. This leads to a desire for suppression of disturbance of airflows around the wheel. Relative winds refer to airflows that move relative to the vehicle body in accompaniment with travel of the vehicle.

As an existing airflow adjusting technique around the wheel, for example, Japanese Unexamined Patent Application Publication (JP-A) No. 2012-56499 describes an airflow adjusting apparatus including a flap. The flap protrudes, in front of a wheel house, downward from a vehicle body. The flap suppresses a relative wind, or a so-called traveling wind, from colliding with the wheel, leading to reduction in an overall drag of a vehicle.

Moreover, in recent years, proposals have been made for airflow adjustment around the vehicle body with the use of a device that actively generates an airflow.

For example, JP-A No. 2019-111965 describes a windshield wiper that wipes a windshield of a vehicle. The windshield wiper includes a wiper arm provided with a plasma actuator that jets out an airflow.

SUMMARY

An aspect of the technology provides an airflow adjusting apparatus to be provided in a vehicle. The vehicle includes a front wheel and a rear wheel that are disposed in a vehicle longitudinal direction to be partly protruded from a bottom surface of a vehicle body of the vehicle downward in a vertical direction of the vehicle body. The first airflow generator is provided on the bottom surface of the vehicle body and behind the front wheel, and configured to generate a first airflow moving backward of the vehicle. The second airflow generator is provided on the bottom surface of the vehicle body and behind the first airflow generator, and configured to generate a second airflow that deflects, vehicle-widthwise inward, an airflow flowing in from a side on which the first airflow generator is disposed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
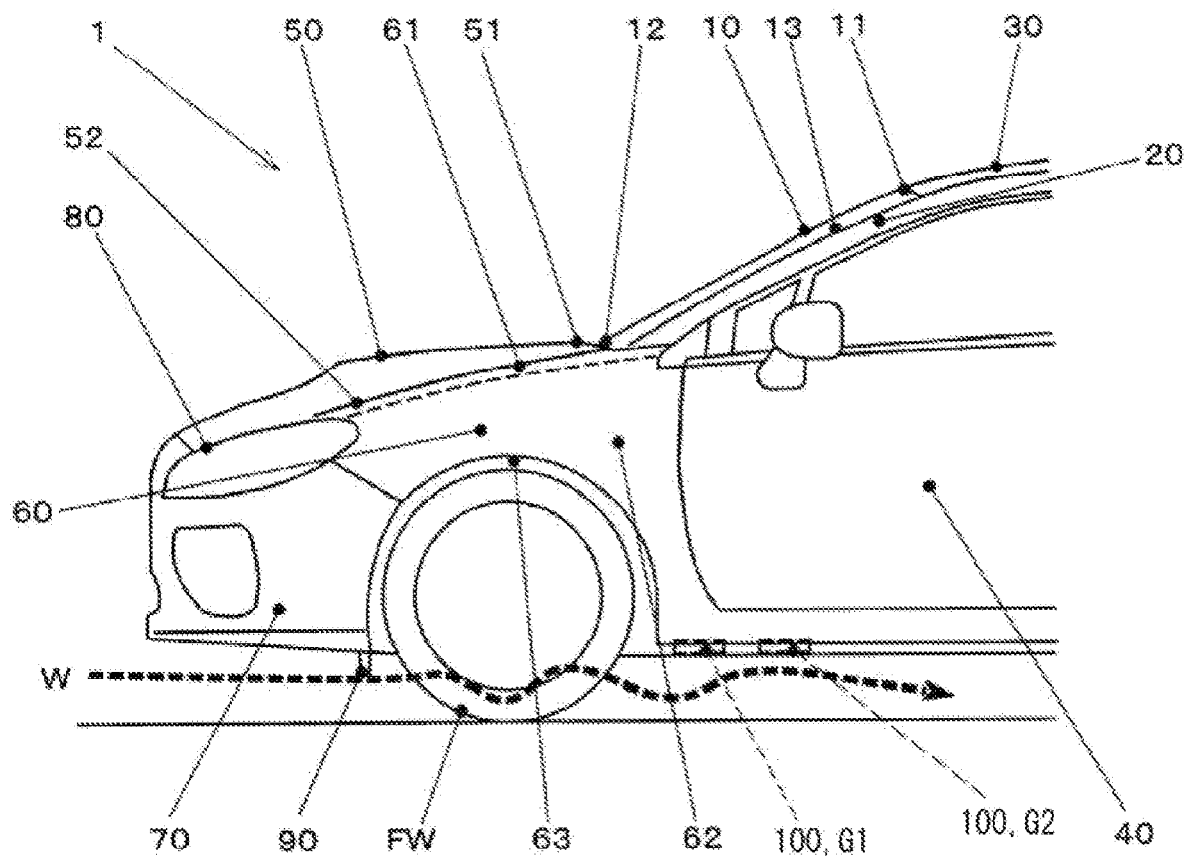
FIG. 1 is a schematic side view of a front portion of a vehicle body of a vehicle including an airflow adjusting apparatus according to an embodiment of the disclosure.

Between an underneath of a vehicle body and a road surface, some airflows collide with front wheels or other components around the front wheels, and separate themselves. The separated airflows are drawn toward airflows having relatively high flow rates along outer side surfaces of the vehicle body. This causes expansion of a turbulent flow accompanied by vortex behind the front wheels, resulting in aggravation of air resistance. Moreover, a flow field centrally of the vehicle becomes unstable, resulting in lowered operation stability.

Furthermore, the airflows having separated themselves at, for example, the front wheels may sometimes form a so-called cut-off region behind wheel houses of the front wheels. A cut-off region means a region where airflows become stagnant at low flow rates. This also constitutes a cause of aggravation of air resistance and operation stability.

It is desirable to provide an airflow adjusting apparatus that makes it possible to appropriately adjust airflows that have separated themselves at or around a front wheel.

Some embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same reference characters to avoid redundant description, and elements not in direct relation to the technology may not be illustrated.

In the following, an airflow adjusting apparatus according to an embodiment of the disclosure is described.

The airflow adjusting apparatus according to the embodiment may be provided in, for example, an automobile, or a moving body. The automobile may be, for example, a passenger car of a so-called two-box or three-box vehicle shape that includes an engine room in front of a cabin.

FIG. 1 is a schematic side view of a front portion of a vehicle body of a vehicle including the airflow adjusting apparatus according to the embodiment.

A vehicle 1 may include, without limitation, a windshield 10, a front pillar 20, a roof 30, a front door 40, a hood 50, a fender 60, a bumper face 70, a front combination lamp 80, and a flap 90.

The windshield 10 is a glass window provided in a front portion of the cabin.

The windshield 10 may have a substantially rectangular shape. The windshield 10 may be disposed in a backward tilted attitude, with an upper end 11 positioned on rear side of the vehicle relative to a lower end 12.

A side end 13 of the windshield 10 may be disposed along the front pillar 20.

The windshield 10 may include laminated glass of a quadric surface, and be curved or rounded to protrude toward front side of the vehicle.

The front pillar 20, or an A pillar, is a vehicle body structural member that extends along the side end 13 of the windshield 10.

A back end of the front pillar 20 may be disposed in adjacency to a sash provided around a front glass door in an upper portion of the front door 40.

The roof 30 is a panel that constitutes an upper surface of the cabin.

The roof 30 may extend, from the upper end 11 of the windshield 10, toward the rear side of the vehicle.

The front door 40 may be an openable and closeable door provided in a side surface of the front portion of the cabin.

The front door 40 may open or close by pivoting around an unillustrated hinge provided at a front end of the front door 40.

The hood 50 is an exterior member provided over an upper portion of the engine room. The hood 50 may be a lid-shaped body of an open and close type.

A rear edge 51 of the hood 50 may be disposed in front of the lower end 12 of the windshield 10, in spaced relation from the lower end 12 in a vehicle longitudinal direction.

A side edge 52 of the hood 50 may be disposed in adjacency to a vehicle-widthwise inner edge of an upper surface 61 of the fender 60, with a gap in between. The gap is unavoidably provided.

The fender 60 is an exterior member of the vehicle that constitutes, for example, a side surface of the engine room.

The fender 60 may include, without limitation, the upper surface 61 and a side surface 62.

The upper surface 61 is a region adjacent to a side end of the side edge 52 of the hood 50. The upper surface 61 may be formed to trace broadly a curved plane extending vehicle-widthwise outward from a curved plane of an outer surface of the hood 50.

The side surface 62 may extend downward from the vicinity of a vehicle-widthwise outer end of the upper surface 61.

Moreover, the side surface 62 may have an arcuate notch 63 of a wheel house that houses a front wheel FW.

The bumper face 70 is a resin-made exterior member provided in a lower portion of a front end of the vehicle.

The bumper face 70 may be provided in front of the arcuate notch 63 in the fender 60.

The front combination lamp 80 may include various lighting devices housed and unitized in a common housing. Non-limiting examples of the lighting devices may include a headlamp, a position lamp, and a turn signal lamp.

The front combination lamp 80 may be disposed on lower side of the hood 50 and on upper side of the bumper face 70 at the front end of the vehicle.

The flap 90 is a plate member protruded, in front of the front wheel FW, downward from an underside of the vehicle body.

The flap 90 may laterally separate a relative wind, or a traveling wind, flowing from forward of the vehicle toward under a floor of the vehicle, to make airflow adjustment and to suppress the relative wind from colliding with the front wheel FW. A relative wind refers to an airflow that moves relative to the vehicle body in accompaniment with travel of the vehicle.

The airflow adjusting apparatus of the embodiment may include plasma actuators 100 and 100T described below.

Figure 2:
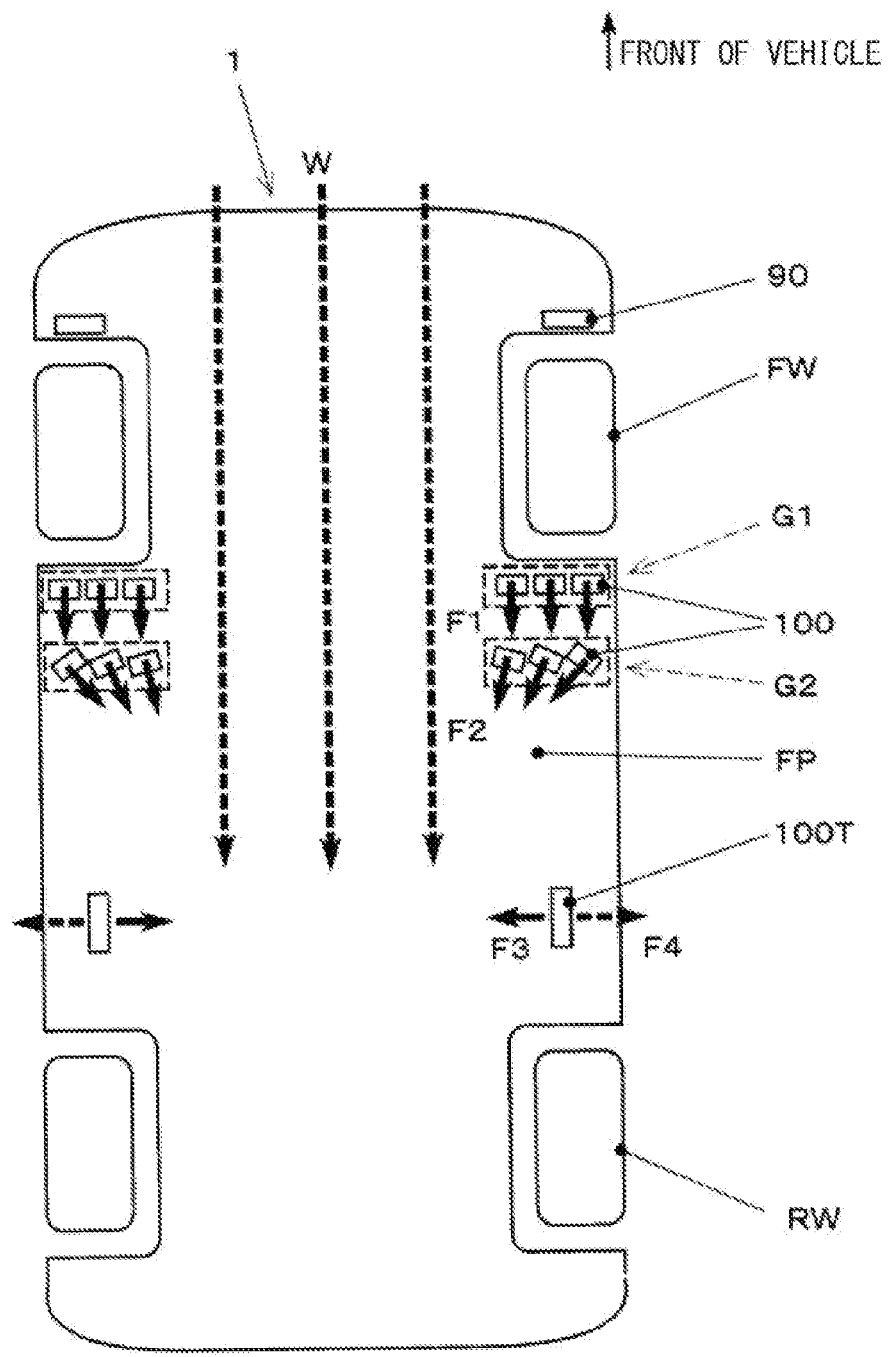
FIG. 2 schematically illustrates the vehicle according to the embodiment, as viewed from underneath.

FIG. 2 schematically illustrates the vehicle of the embodiment, as viewed from underneath.

As illustrated in FIG. 2, a plurality of the plasma actuators 100 and 100T may be provided on a floor panel FP. The floor panel FP may constitute an underside of the vehicle body of the vehicle 1.

The plasma actuators 100 and 100T may generate airflows F, with electric power supplied from a power supply device. In one embodiment of the disclosure, the plasma actuators 100 and 100T may serve as an "airflow generator".

Each of the plurality of the plasma actuators 100 and 100T is configured to generate, or eject, airflows F1, F2, F3, and/or F4 along the floor panel FP as the underside of the vehicle body. The airflows F1, F2, F3, and F4 move substantially along a horizontal direction.

The plasma actuator 100 may include a first group G1 and a second group G2 described below. The first group G1 and the second group G2 may each include a plurality of the plasma actuators 100.

The plasma actuators 100 of the first group G1 may be disposed in a region of the floor panel FP, adjacent to a rear end of the wheel house that houses the front wheel FW. In one embodiment of the disclosure, the plasma actuators 100 of the first group G1 may serve as a "first airflow generator".

The plasma actuators 100 of the first group G1 may be disposed at or in the vicinity of a position at which a relative wind flowing in from forward of the vehicle is locally reduced in a flow rate by interference with the front wheel FW and components around the front wheel FW.

The plasma actuators 100 of the first group G1 are each configured to generate the airflow F1. The airflow F1 moves along a lower surface of the floor panel FP, and moves backward of the vehicle along the vehicle longitudinal direction. In one embodiment of the disclosure, the airflow F1 may serve as a "first airflow".

The airflows F1 form an airflow Fs in which the stagnant air behind the front wheel FW moves backward of the vehicle. For the airflow Fs, see FIGS. 6 to 8.

For example, the first group G1 may include the three plasma actuators 100 disposed along a vehicle widthwise direction.

The plasma actuators 100 of the second group G2 may be disposed in a region of the floor panel FP, adjacent to and behind the first group G1. In one embodiment of the disclosure, the plasma actuators 100 of the second group G2 may serve as a "second airflow generator".

The airflow generators 100 of the second group G2 are each configured to generate the airflow F2. The airflow F2 moves along the lower surface of the floor panel FP, and moves obliquely relative to the vehicle longitudinal direction, backward of the vehicle and vehicle-widthwise inward.

The airflow F2 is configured to deflect a direction of movement of a main flow component of an airflow flowing in from the side on which the plasma actuators 100 of the first group G1 are disposed. Thus, the main flow component moves vehicle-widthwise inwardly from the rear wheel RW, at least in a range of traveling conditions of a predetermined vehicle speed and a predetermined steering angle. In one embodiment of the disclosure, the airflow F2 may serve as a "second airflow".

For example, the second group G2 may include the three plasma actuators 100 disposed along the vehicle widthwise direction.

Directions of movement of the airflows F2 of the plasma actuators 100 of the second group G2 may be set to allow deflection angles of the second airflows F2 relative to the vehicle longitudinal direction to become greater sequentially from vehicle-widthwise inside to vehicle-widthwise outside. The deflection angle means an inclination angle formed by the airflow F2 with the vehicle longitudinal direction.

The laterally oriented plasma actuators 100T may be further provided in a region of the floor panel FP, behind the first group G1 and the second group G2, and in front of the rear wheel RW. In one embodiment of the disclosure, the laterally oriented plasma actuators 100T may serve as a "third airflow generator".

The plasma actuator 100T is configured to selectively generate the airflows F3 and F4. The airflow F3 moves along the floor panel FP and vehicle-widthwise inward. The airflow F4 moves along the floor panel FP and vehicle-widthwise outward. In one embodiment of the disclosure, the airflows F3 and F4 may serve as a "third airflow".

Figure 3:
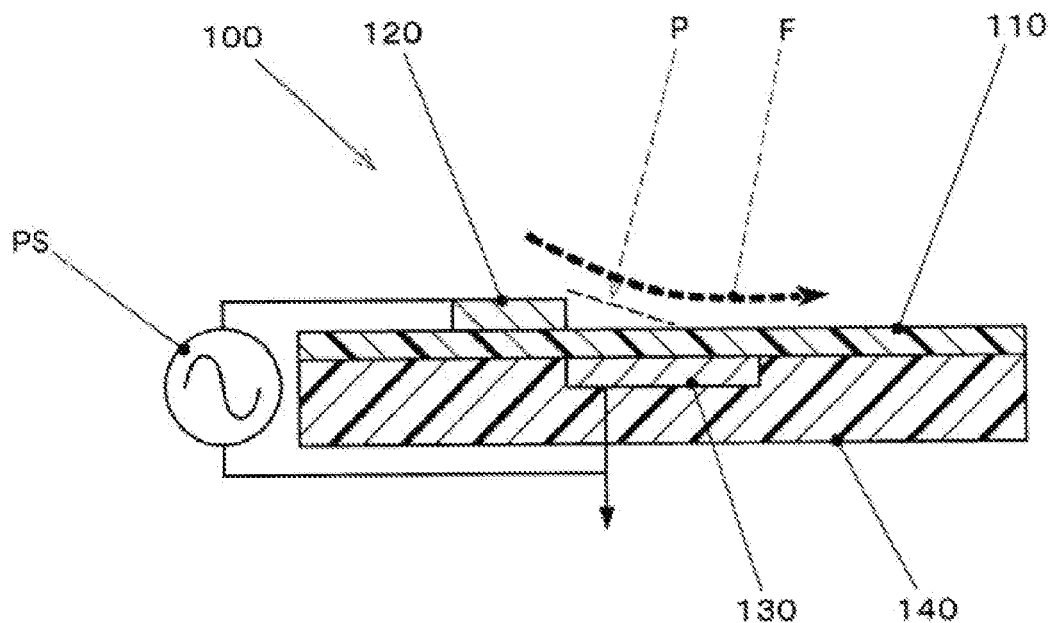
FIG. 3 is a schematic cross-sectional view of a bipolar plasma actuator to be provided in the airflow adjusting apparatus according to the embodiment.

FIG. 3 is a schematic cross-sectional view of a bipolar plasma actuator to be provided in the airflow adjusting apparatus of the embodiment.

The bipolar plasma actuator 100 may include, without limitation, a dielectric 110, an upper electrode 120, a lower electrode 130, and an insulator 140.

It is to be noted that the plasma actuator 100T may have a similar configuration.

In this embodiment, the bipolar plasma actuator is adopted, but a three-pole plasma actuator may be adopted. The three-pole plasma actuator may include a plurality of electrode pairs.

In particular, adopting the three-pole plasma actuator as the plasma actuator 100T makes it possible to make gradual changes from the airflow F3 to the airflow F4, or from the airflow F4 to the airflow F3. Hence, it is possible to suppress rapid changes in vehicle stability.

The dielectric 110 may be a sheet-shaped member including, for example, a fluorocarbon resin such as polytetrafluoroethylene.

The upper electrode 120 and the lower electrode 130 may each include an electrically-conductive tape including a thin metal film of, for example, copper.

The upper electrode 120 may be attached to outer surface side of the dielectric 110. The outer surface side of the dielectric 110 refers to side exposed to the outside when the plasma actuator 100 is attached to, for example, the vehicle body.

The lower electrode 130 may be attached to inner surface side of the dielectric 110 that is opposite to the outer surface side of the dielectric 110.

The upper electrode 120 and the lower electrode 130 may be offset in an in-plane direction of the dielectric 110.

The insulator 140 may be a sheet-shaped member that serves as a base of the plasma actuator 100. The insulator 140 may be provided, on the inner surface side of the dielectric 110, to cover the lower electrode 130.

Allowing a power supply PS to apply an alternating voltage having a predetermined waveform to the upper electrode 120 and the lower electrode 130 of the plasma actuator 100 causes generation of a plasma discharge P between the electrodes.

It is necessary for the applied voltage to be high enough to cause electrical breakdown and generate the plasma discharge P. For example, the applied voltage may range from about 1 kV to about 10 kV.

A frequency of the applied voltage may range, for example, from about 1 kHz to about 10 kHz.

At this occasion, the air on the outer surface side of the plasma actuator 100 is drawn to the plasma discharge P, causing generation of the airflow F in a wall jet.

Moreover, the plasma actuator 100 is configured to reverse a direction of the airflow F, by controlling the waveform of the alternating voltage to be applied.

The airflow adjusting apparatus of the embodiment may include a control system described below, to supply driving electric power to the plasma actuators 100 and 100T described above, allowing the plasma actuators 100 and 100T to generate the airflows F1, F2, F3, and F4 for airflow adjustment of airflows moving between the underneath of the vehicle body and the road surface.

Figure 4:
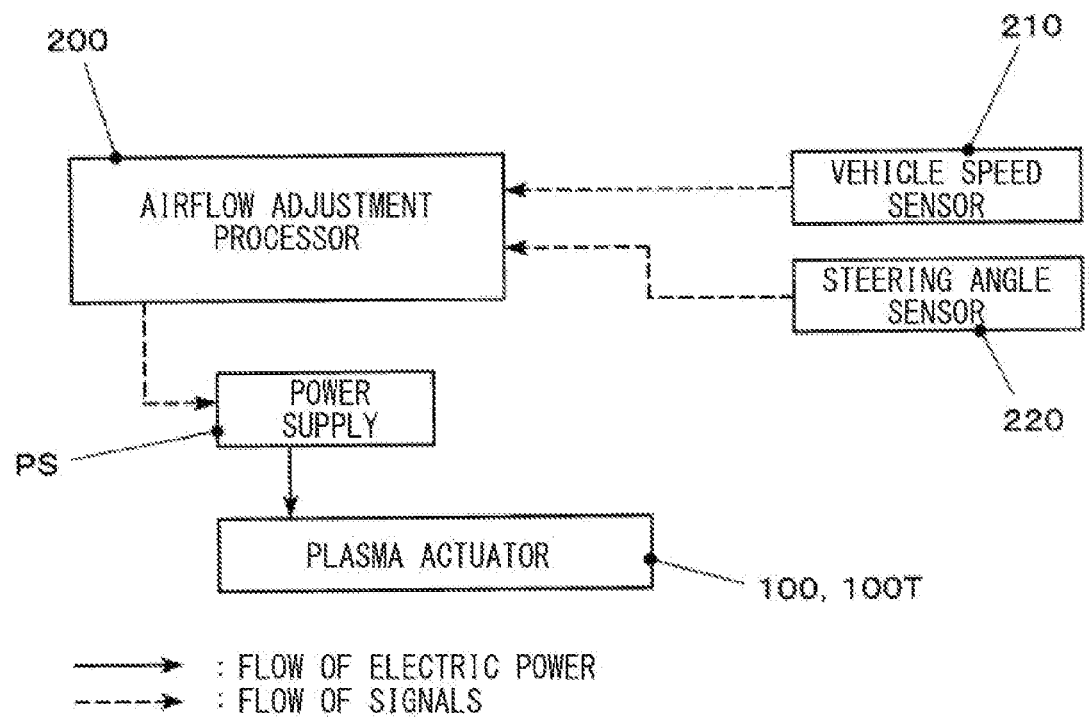
FIG. 4 is a block diagram illustrating a configuration of a control system of the plasma actuator in the airflow adjusting apparatus according to the embodiment.

FIG. 4 is a block diagram illustrating a configuration of the control system of the plasma actuator in the airflow adjusting apparatus of the embodiment.

The control system may include, without limitation, an airflow adjustment processor 200, a vehicle speed sensor 210, and a steering angle sensor 220.

The airflow adjustment processor 200 may control the power supply PS to control whether to operate or stop the plasma actuators 100 and 100T. In operating the plasma actuators 100 and 100T, the airflow adjustment processor 200 may control strength of the airflows F1, F2, F3, and F4, e.g., an amount of flow and a flow rate.

The airflow adjustment processor 200 may include, for example, a microcomputer including, without limitation, an information processor such as a CPU (Central Processing Unit), a storage such as a RAM (Random Access Memory) and/or a ROM (Read Only Memory), input and output interfaces, and a bus that couples them together.

The vehicle speed sensor 210 may detect a traveling speed of the vehicle 1, or a vehicle speed.

The vehicle speed sensor 210 may be provided in a hub bearing housing that rotatably holds the front wheel FW or a rear wheel RW. The vehicle speed sensor 210 is configured to output a vehicle speed signal corresponding to a rotational speed of the wheel.

The steering angle sensor 220 may detect a steering angle of the front wheel FW.

The steering angle sensor 220 may be provided as, for example, a part of an unillustrated electric power steering device. The steering angle sensor 220 may include an angle encoder that detects an angle position of a steering shaft. The steering shaft may transmit rotation of a steering wheel to a steering gear box.

Description is given next of operation of the airflow adjusting apparatus of the embodiment.

Figure 5:
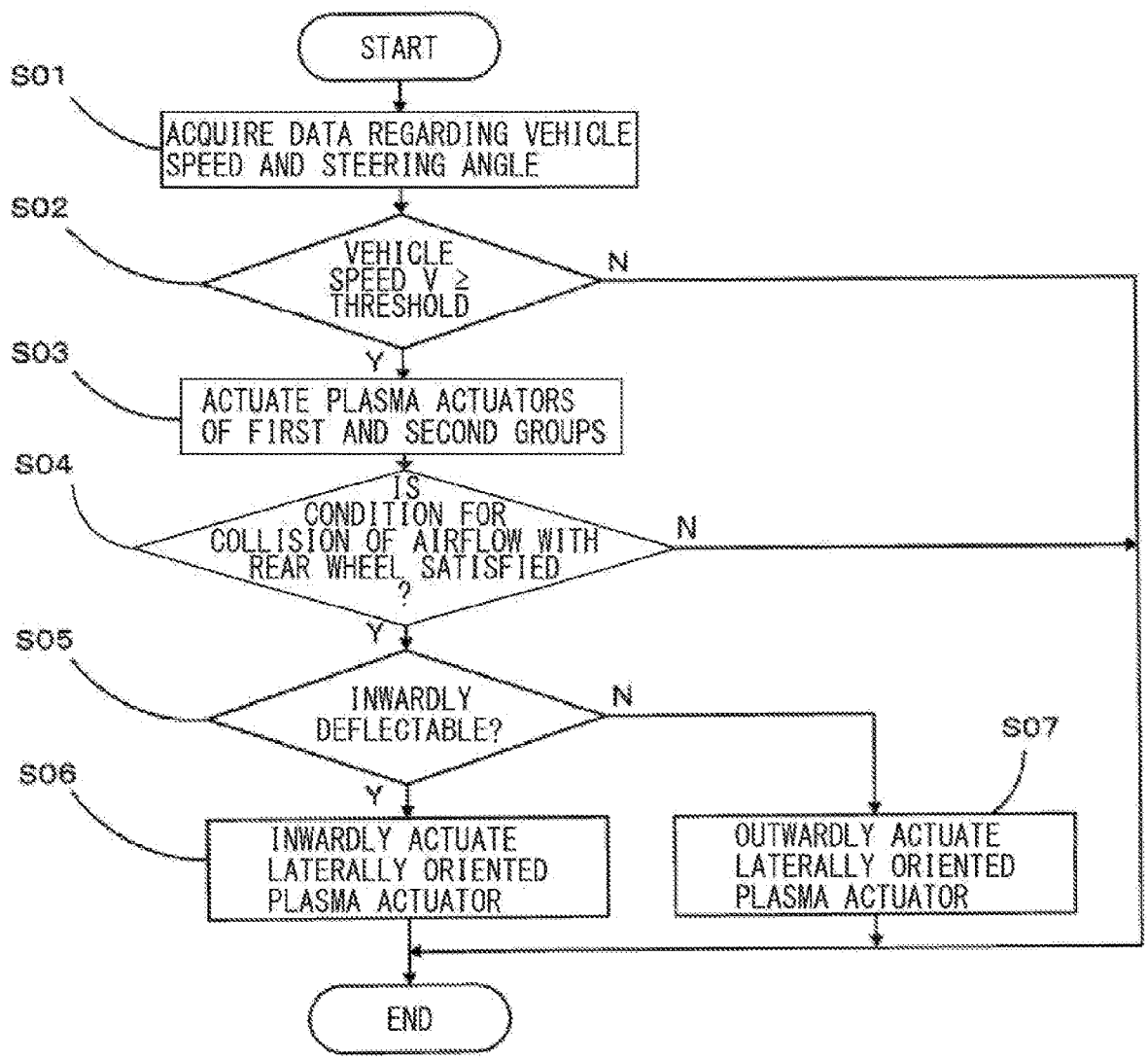
FIG. 5 is a flowchart of a driving control of the plasma actuator in the airflow adjusting apparatus according to the embodiment.

FIG. 5 is a flowchart of a driving control of the plasma actuator in the airflow adjusting apparatus of the embodiment.

In the following, description is given in the order of steps.

<Step S01: Acquire Data regarding Vehicle Speed and Steering Angle>

The airflow adjustment processor 200 may acquire data regarding the current vehicle speed of the vehicle 1 and the current steering angle of the front wheel FW, on the basis of an output of the vehicle speed sensor 210 and an output of the steering angle sensor 220.

Thereafter, the flow may proceed to step S02.

<Step S02: Determination as to Vehicle Speed>

The airflow adjustment processor 200 may determine whether or not the current vehicle speed V falls within a predetermined range of the vehicle speed in which an airflow adjustment control using the plasma actuators 100 and 100T is effective.

For example, the airflow adjustment processor 200 may compare the vehicle speed V to a predetermined threshold set in advance.

In a case where the vehicle speed V is higher than the threshold (Y in step S02), the flow may proceed to step S03. Otherwise (N in step S02), the flow may terminate the series of processing or return.

<Step S03: Actuate Plasma Actuators of First and Second Groups>

The airflow adjustment processor 200 may perform electric power supply to the plasma actuators 100 of the first group G1 and the second group G2, causing generation of the airflows F1 and F2.

At this occasion, the strength of the airflows F1 and F2, e.g., the flow rates and the amounts of flow, may be set to become greater in accordance with an increase in the vehicle speed V.

Thereafter, the flow may proceed to step S04.

<Step S04: Determination as to Condition for Collision of Airflow with Rear Wheel>

The airflow adjustment processor 200 may determine whether or not the main flow component of the airflow Fs is going to collide with the rear wheel RW. The main flow component of the airflow Fs has a maximum speed in the airflow Fs generated by the plasma actuators 100 of the first group G1 and the second group G2.

Conditions to be used in the determination may be set experimentally in advance or by, for example, fluid analysis simulation. The setting of the conditions may be made with parameters such as the vehicle speed, the steering angle, and the strength of the airflows F1 and F2.

In a case with high possibility that the airflow Fs is going to collide with the rear wheel RW (Y in step S04), the flow may proceed to step S05. Otherwise (N in step S04), the flow may terminate the series of processing or return.

<Step S05: Determination as to Inward Deflectability>

The airflow adjustment processor 200 may determine whether or not the airflow Fs causing concern about the collision with the rear wheel RW is deflectable enough to avoid the rear wheel RW by the airflow F3 to be generated by the laterally oriented plasma actuator 100T. The airflow F3 moves vehicle-widthwise inward.

Conditions to be used in the determination may be also set, as with step S04, experimentally in advance, or by, for example, fluid analysis simulation.

In a case where the airflow Fs is deflectable enough to pass vehicle-widthwise inwardly from the rear wheel RW (Y in step S05), the flow may proceed to step S06. Otherwise (N in step S05), the flow may proceed to step S07.

<Step S06: Inwardly Actuate Laterally Oriented Plasma Actuator>

The airflow adjustment processor 200 may allow the plasma actuator 100T to generate the airflow F3 that moves vehicle-widthwise inward. Thus, the airflow adjustment processor 200 may deflect the airflow Fs, to allow the airflow Fs to pass vehicle-widthwise inwardly from the rear wheel RW. The airflow Fs flows in from the side on which the plasma actuators 100 of the second group G2 are disposed.

Thereafter, the flow may terminate the series of processing or return.

<Step S07: Outwardly Actuate Laterally Oriented Plasma Actuator>

The airflow adjustment processor 200 may allow the plasma actuator 100T to generate the airflow F4 that moves vehicle-widthwise outward. Thus, the airflow adjustment processor 200 may deflect the airflow Fs, to allow the airflow Fs to pass vehicle-widthwise outwardly from the rear wheel RW. The airflow Fs flows in from the side on which the plasma actuators 100 of the second group G2 are disposed.

Thereafter, the flow may terminate the series of processing or return.

Figure 6:
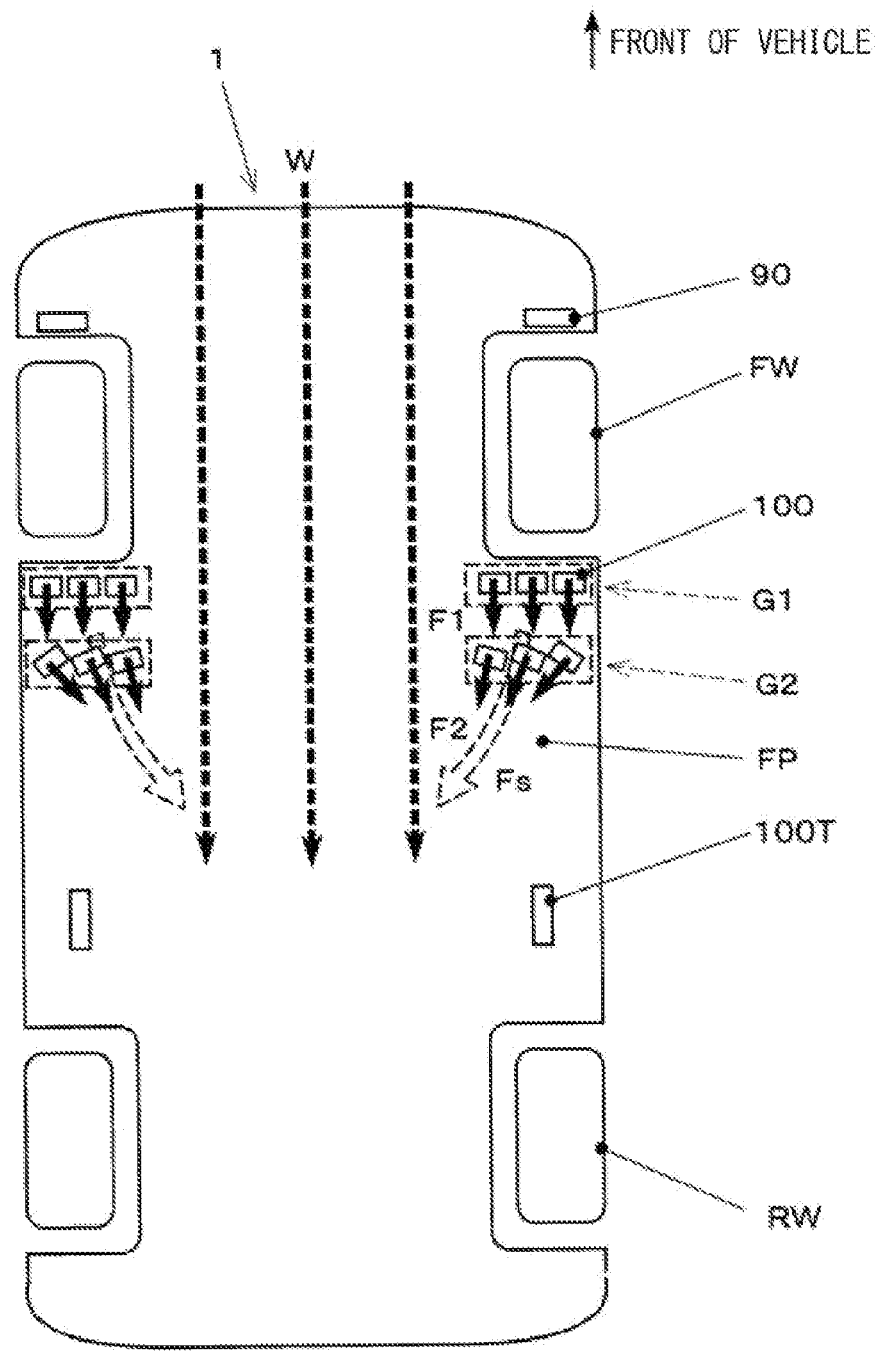
FIG. 6 schematically illustrates an example of behavior of airflows under the vehicle body in the airflow adjusting apparatus according to the embodiment.
Figure 7:
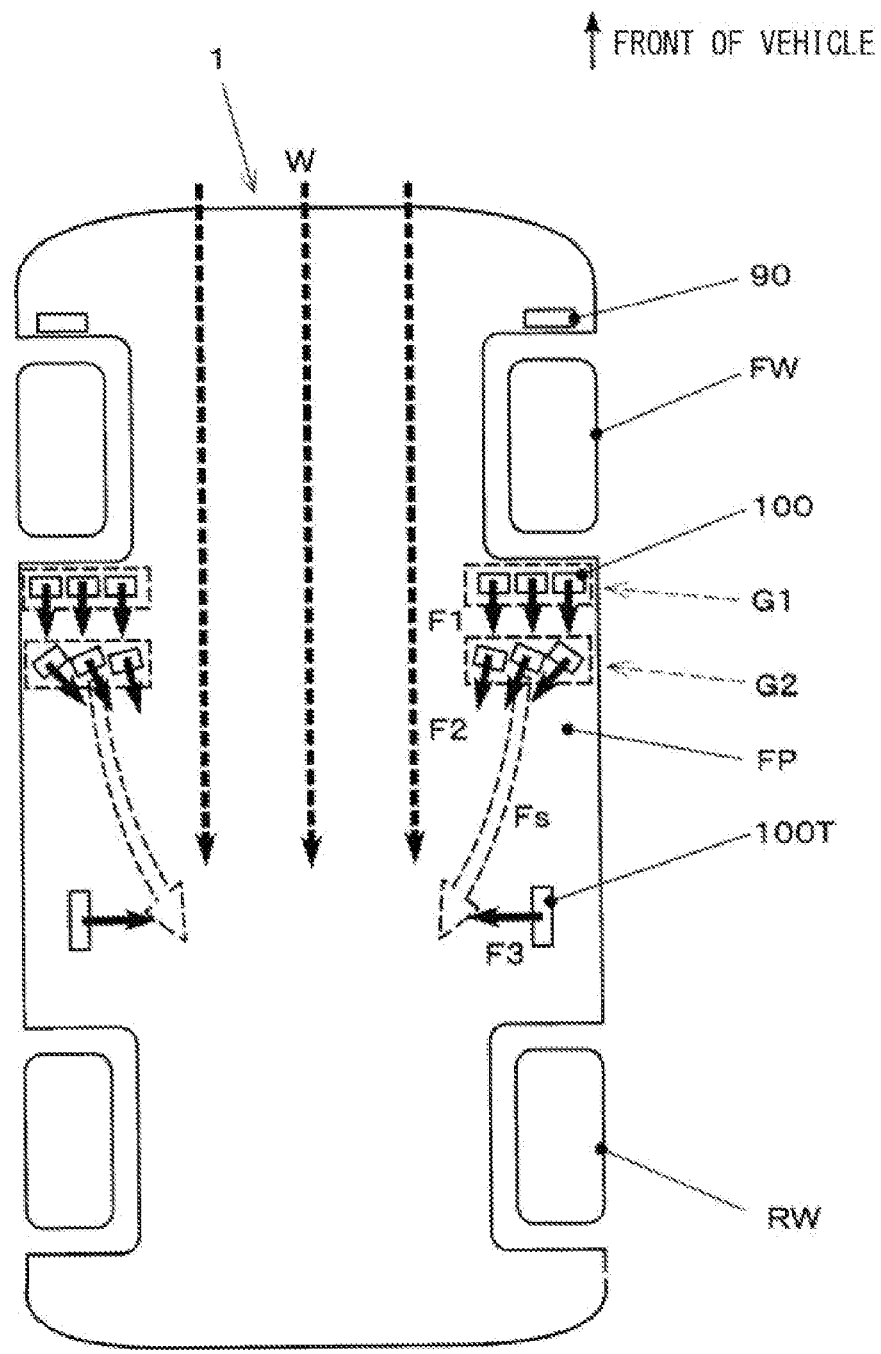
FIG. 7 schematically illustrates another example of the behavior of airflows under the vehicle body in the airflow adjusting apparatus according to the embodiment.
Figure 8:
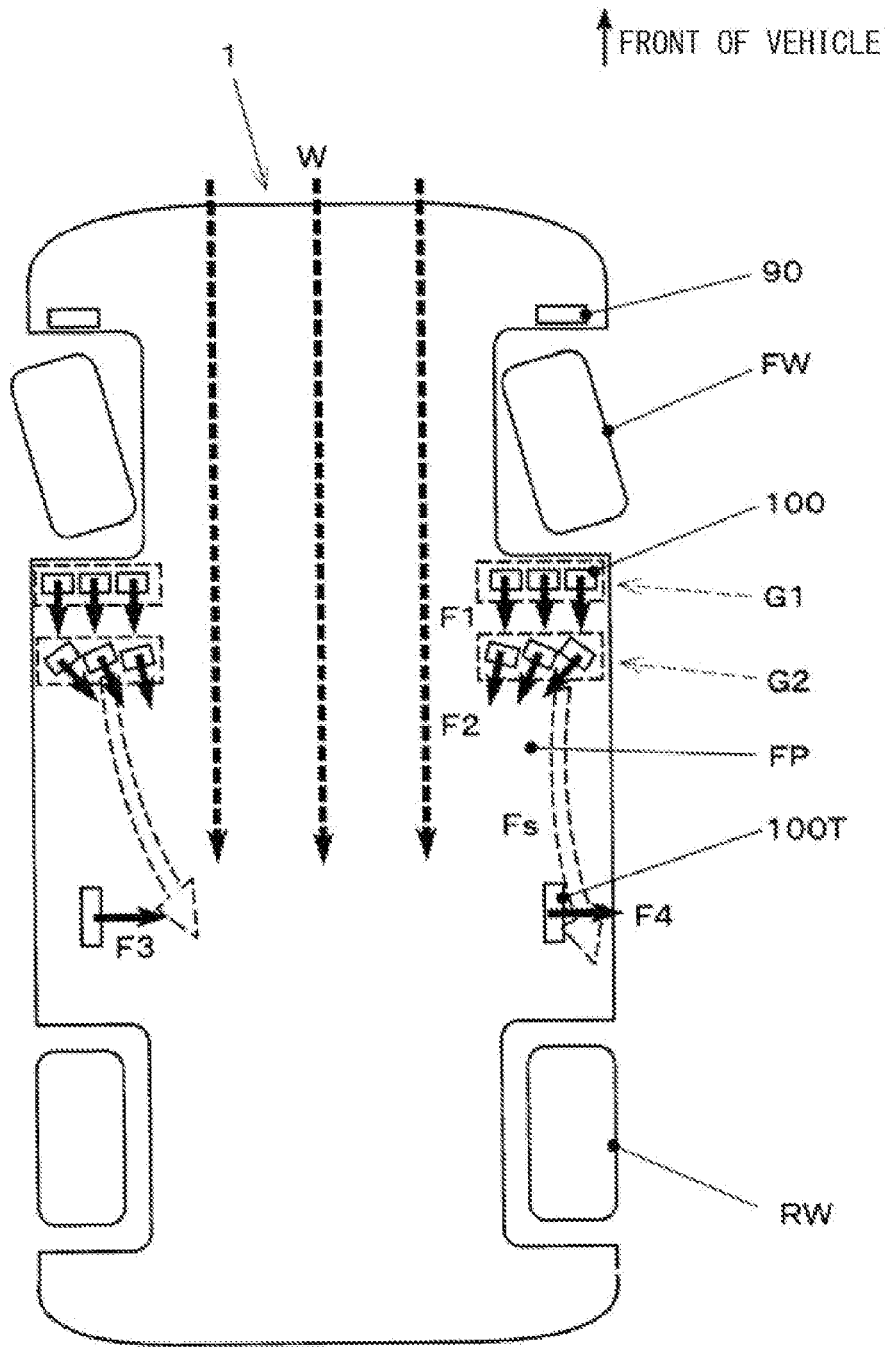
FIG. 8 schematically illustrates another example of the behavior of airflows under the vehicle body in the airflow adjusting apparatus according to the embodiment.

FIGS. 6 to 8 each illustrate an example of behavior of airflows under the vehicle body in the airflow adjusting apparatus of the embodiment.

As with FIG. 2, FIGS. 6 to 8 illustrate the vehicle 1 as viewed from underneath.

On normal travel, as illustrated in FIG. 6, a control may be carried out to allow the plasma actuators 100 of the first group G1 and the second group G2 to respectively generate the airflows F1 and F2.

Thus, the stagnant air behind the front wheel FW is first accelerated to the rear side of the vehicle by the airflow F1 generated by the plasma actuators 100 of the first group G1. Thereafter, the accelerated air is deflected vehicle-widthwise inward, while being further accelerated, by the airflow F2 generated by the plasma actuators 100 of the second group G2.

The airflow Fs passes through a region in which the second group G2 is provided, and joins a relative wind W having a relatively high flow rate and moving vehicle-widthwise centrally. Thus, the airflow Fs is discharged to the rear side of the vehicle while turbulence is suppressed from growing.

FIG. 7 illustrates a state in which the vehicle speed is relatively higher than in FIG. 6.

An increase in the vehicle speed causes an increase in the flow rate of the airflow Fs moving to the rear side of vehicle relative to the vehicle body. This contributes a decrease in a deflection angle of the airflow Fs to be obtained by the airflow F2 generated by the plasma actuators 100 of the second group G2. Neglecting such a decrease in the deflection angle may result in concern about the collision of the airflow Fs with the rear wheel RW.

In the embodiment, in such a case, the laterally oriented plasma actuator 100T generates the airflow F3, to deflect, vehicle-widthwise inward, the airflow Fs having passed through the second group G2. This leads to suppression of the collision of the airflow Fs with the rear wheel RW.

FIG. 8 illustrates an example where the vehicle is turning to the right, with the left front wheel FW (on the right in FIG. 8) being steered toe-in, and with the right front wheel FW (on the left in FIG. 8) being steered toe-out.

In a case where the front wheel FW is being steered toe-out, an airflow that has separated itself at the front wheel FW moves obliquely to be directed vehicle-widthwise outward, or expandwise, on the rear side of the vehicle in the vehicle longitudinal direction. This causes difficulty in joining the airflow Fs behind the front wheel FW to the relative wind W moving centrally of the vehicle. Thus, there arises concern that even the control of generating the airflows F1, F2, and F3 may fail to inhibit the airflow Fs from colliding with the rear wheel RW.

In this embodiment, in such a case, the laterally oriented plasma actuator 100T generates the airflow F4 moving vehicle-widthwise outward, to deflect the airflow Fs behind the front wheel FW, vehicle-widthwise outward. This causes the airflow Fs to be discharged vehicle-widthwise outward, avoiding the collision with the rear wheel RW.

Moreover, in a case with an even higher vehicle speed than in FIG. 7, carrying out a similar control makes it possible to suppress the airflow Fs at a high flow rate from colliding with the rear wheel RW.

As described, in the embodiment, it is possible to produce the following effects.

(1) The air that has separated itself at the front wheel FW becomes stagnant behind the front wheel FW. Allowing the plasma actuators 100 of the first group G1 to generate the airflow F1 causes the stagnant air to be accelerated to the rear side of the vehicle, to form the airflow Fs. Furthermore, allowing the plasma actuators 100 of the second group G2 to generate the airflow F2 causes the airflow Fs to be deflected vehicle-widthwise inward. This makes it possible to join the airflow Fs to the relative wind W having a relatively high flow rate and moving vehicle-widthwise centrally of the vehicle. Hence, it is possible to discharge the airflow Fs quickly.

This leads to improvement in air resistance, aerodynamic noise, aerodynamic vibration, and operation stability of the vehicle 1.

(2) The plasma actuators 100 of the first group G1 may be disposed in the so-called cut-off region. The cut-off region is a position where a relative wind flowing in from forward of the vehicle is locally reduced in the flow rate by the interference with the front wheel FW. This makes it possible to discharge the stagnant air in the cut-off region, and to produce the forgoing effects reliably.

(3) The plasma actuators 100 of the second group G2 may be configured to deflect the direction of movement of the main flow component of the airflow Fs flowing in from the side on which the plasma actuators 100 of the first group G1 are disposed. The main flow component of the airflow Fs has the maximum flow rate in the airflow Fs. Thus, the main flow component passes vehicle-widthwise inwardly from the rear wheel RW. Hence, it is possible to prevent the airflow Fs from colliding with the rear wheel RW, leading to prevention of, for example, aggravation of air resistance caused by the collision of the airflow Fs with the rear wheel RW.

(4) The laterally oriented plasma actuator 100T may be provided between the plasma actuators of the second group G2 and the rear wheel RW. The plasma actuator 100T may be configured to generate the airflows F3 and F4 along the vehicle widthwise direction. Accordingly, in the case with high possibility of the collision of the airflow Fs generated by the plasma actuators 100 of the first group G1 and the second group G2 with the rear wheel RW, the airflow Fs is blown away vehicle-widthwise inward or outward by the laterally oriented plasma actuator 100T. Hence, it is possible to prevent the airflow Fs from colliding with the rear wheel RW.

(5) The plasma actuators 100 and 100T may be adopted to generate the airflows F1, F2, F3, and F4. Thanks to the simple configuration of the plasma actuators 100 and 100T devoid of movable components, it is possible to generate the airflows F1, F2, F3, and F4 with high responsiveness.

Modification Examples

Although some embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

(1) The configurations of the vehicle and the airflow adjusting apparatus are not limited to the forgoing embodiments, but may be changed as appropriate.

(2) The arrangement and the number of the plasma actuators in the forgoing embodiments, or the "airflow generators" in one embodiment of the disclosure, are merely exemplary, and may be changed as appropriate.

(3) In the forgoing embodiments, the plasma actuator may serve as the "airflow generator" in one embodiment of the disclosure, but the airflow generation may be carried out by other methods than the use of the plasma actuator.

The configuration of the plasma actuator is not limited to those of the forgoing embodiments, but may be changed as appropriate.

(4) In the forgoing embodiments, the common, laterally oriented plasma actuator generates the airflows vehicle-widthwise inward and outward. However, independent airflow generators may generate the airflows vehicle-widthwise inward and outward.

Moreover, a direction of generation of the airflows may be limited to the vehicle widthwise direction but may be an inclined direction to the vehicle widthwise direction.

(5) In the forgoing embodiments, the alternating voltage is applied between the electrodes of the plasma actuator. However, in an alternative configuration, a DC voltage may be applied. For example, a DC voltage may be pulsed at a predetermined frequency. In the case with the DC voltage application, polarity may be switchable, to control the direction of the generation of the airflow.

In a case with the use of the three-pole plasma actuator, an alternating voltage may be applied to both electrode pairs, or alternatively, a DC voltage may be applied to both electrode pairs. In another alternative, an alternating voltage may be applied to one electrode pair, while a DC voltage may be applied to the other electrode pair.

According to an aspect of the technology, an airflow adjusting apparatus includes a first airflow generator and a second airflow generator. The first airflow generator is provided behind a front wheel, and configured to generate a first airflow moving backward of the vehicle. The second airflow generator is provided behind the first airflow generator, and configured to generate a second airflow that deflects, vehicle-widthwise inward, an airflow flowing in in from side on which the first airflow generator is disposed.

The air that has separated itself at the front wheel or other components around the front wheel, e.g., a flap, becomes stagnant behind the front wheel. Allowing the first airflow generator to generate the first airflow makes it possible to accelerate the stagnant air to the rear side of the vehicle. Moreover, allowing the second airflow generator to generate the second airflow to deflect the accelerated air vehicle-widthwise inward makes it possible to join the accelerated air to an airflow having a relatively high flow rate and moving vehicle-widthwise centrally of the vehicle. Hence, it is possible to discharge the airflow quickly, while suppressing turbulence.

This leads to improvement in air resistance, aerodynamic noise, aerodynamic vibration, and operation stability of the vehicle.

Moreover, the first airflow generator may be disposed at or in the vicinity of a position where a relative wind flowing in from forward of the vehicle is locally reduced in a flow rate by interference with the front wheel or a component provided around the front wheel.

Hence, it is possible to discharge forcibly the stagnant air behind the front wheel, and to produce the forgoing effects reliably.

Furthermore, the second airflow generator may be configured to deflect a direction of movement of a main flow component of the airflow flowing in from the side on which the first airflow generator is disposed. The main flow component moves vehicle-widthwise inwardly from the rear wheel.

Hence, it is possible to prevent the airflow caused by the first airflow generator and the second airflow generator from colliding with the rear wheel. This leads to prevention of, for example, aggravation of air resistance caused by the collision of the airflow with the rear wheel.

In addition, a third airflow generator may be provided between the second airflow generator and the rear wheel. The third airflow generator is configured to generate a third airflow along the vehicle widthwise direction.

Thus, in a case with high possibility that the airflow generated by the first airflow generator and the second airflow generator is going to collide with the rear wheel, the relevant airflow is blown away in the vehicle widthwise direction by the third airflow generator. Hence, it is possible to prevent the relevant airflow from colliding with the rear wheel.

Moreover, the first airflow generator, the second airflow generator, or both may include a plasma actuator. The plasma actuator may include: at least one pair of electrodes disposed with a dielectric in between; and a power supply configured to apply a voltage to the at least one pair of the electrodes.

Thanks to the simple configuration of the first airflow generator and the second airflow generator devoid of movable components, it is possible to generate the first airflow and the second airflow with high responsiveness.

As described, according to the aspects of the technology, it is possible to provide an airflow adjusting apparatus that makes it possible to adjust appropriately airflows that has separated itself at or around a front wheel.

The airflow adjustment processor 200 illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airflow adjustment processor 200. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the airflow adjustment processor 200 illustrated in FIG. 4.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. An airflow adjusting apparatus to be provided in a vehicle, the vehicle including a front wheel and a rear wheel that are disposed in a vehicle longitudinal direction to be partly protruded from a bottom surface of a vehicle body of the vehicle downward in a vertical direction of the vehicle body, the airflow adjusting apparatus comprising:
a first airflow generator provided on the bottom surface of the vehicle body and behind the front wheel, and configured to generate a first airflow moving backward of the vehicle toward a second airflow generator; and
the second airflow generator provided on the bottom surface of the vehicle body and behind the first airflow generator, and configured to generate a second airflow that deflects obliquely relative to the vehicle longitudinal direction, backward of the vehicle and vehicle-widthwise inward, an airflow flowing in from a side on which the first airflow generator is disposed.

2. The airflow adjusting apparatus according to claim 1, wherein
the first airflow generator is disposed at or in vicinity of a position at which a relative wind flowing in from forward of the vehicle is locally reduced in a flow rate by interference with the front wheel or a component provided around the front wheel.

3. The airflow adjusting apparatus according to claim 2, wherein
the second airflow generator is configured to deflect a direction of movement of a main flow component of the airflow flowing in from the side on which the first airflow generator is disposed, to allow the main flow component to move vehicle-widthwise inwardly from the rear wheel, the main flow component having a maximum speed in the airflow flowing in from the side on which the first airflow generator is disposed.

4. The airflow adjusting apparatus according to claim 3, further comprising a third airflow generator provided between the second airflow generator and the rear wheel and configured to generate a third airflow having a speed component along a vehicle widthwise direction.

5. The airflow adjusting apparatus according to claim 4, wherein
the first airflow generator, the second airflow generator, or both include a plasma actuator including:
at least one pair of electrodes disposed with a dielectric in between; and
a power supply configured to apply a voltage to the at least one pair of the electrodes.

6. The airflow adjusting apparatus according to claim 3, wherein
the first airflow generator, the second airflow generator, or both include a plasma actuator including:

at least one pair of electrodes disposed with a dielectric in between; and a power supply configured to apply a voltage to the at least one pair of the electrodes.

7. The airflow adjusting apparatus according to claim 2, further comprising a third airflow generator provided between the second airflow generator and the rear wheel and configured to generate a third airflow having a speed component along a vehicle widthwise direction.

8. The airflow adjusting apparatus according to claim 7, wherein
the first airflow generator, the second airflow generator, or both include a plasma actuator including:
at least one pair of electrodes disposed with a dielectric in between; and
a power supply configured to apply a voltage to the at least one pair of the electrodes.

9. The airflow adjusting apparatus according to claim 2, wherein
the first airflow generator, the second airflow generator, or both include a plasma actuator including:
at least one pair of electrodes disposed with a dielectric in between; and
a power supply configured to apply a voltage to the at least one pair of the electrodes.

10. The airflow adjusting apparatus according to claim 1, wherein
the second airflow generator is configured to deflect a direction of movement of a main flow component of the airflow flowing in from the side on which the first airflow generator is disposed, to allow the main flow component to move vehicle-widthwise inwardly from the rear wheel, the main flow component having a maximum speed in the airflow flowing in from the side on which the first airflow generator is disposed.

11. The airflow adjusting apparatus according to claim 10, further comprising a third airflow generator provided between the second airflow generator and the rear wheel and configured to generate a third airflow having a speed component along a vehicle widthwise direction.

12. The airflow adjusting apparatus according to claim 11, wherein
the first airflow generator, the second airflow generator, or both include a plasma actuator including:
at least one pair of electrodes disposed with a dielectric in between; and
a power supply configured to apply a voltage to the at least one pair of the electrodes.

13. The airflow adjusting apparatus according to claim 10, wherein
the first airflow generator, the second airflow generator, or both include a plasma actuator including:
at least one pair of electrodes disposed with a dielectric in between; and
a power supply configured to apply a voltage to the at least one pair of the electrodes.

14. The airflow adjusting apparatus according to claim 1, wherein
the first airflow generator, the second airflow generator, or both include a plasma actuator including:
at least one pair of electrodes disposed with a dielectric in between; and
a power supply configured to apply a voltage to the at least one pair of the electrodes.

15. The airflow adjusting apparatus according to claim 1, wherein
the second airflow generator is set to allow deflection angles of the second airflows relative to a vehicle longitudinal direction to become greater sequentially from vehicle-widthwise inside to vehicle-widthwise outside.

16. The airflow adjusting apparatus according to claim 1, further comprising a processor configured to:
acquire data regarding the current vehicle speed of the vehicle and the current steering angle of a front wheel, on a basis of an output of a vehicle speed sensor and an output of a steering angle sensor, and
determine characteristics of the first airflow and the second airflow.

17. The airflow adjusting apparatus according to claim 16, wherein the processor is configured to control the first airflow generator and the second airflow generators based on the current steering angle, vehicle speed and the characteristics of the first airflow and the second airflow.

18. The airflow adjusting apparatus according to claim 17, wherein the second airflow generator disposed in series with the first airflow generator, accelerates and changes a direction of the first airflow with the second airflow,
wherein the second airflow generator generating the second airflow in a different direction than the first airflow generated by the first airflow generator.

19. An airflow adjusting apparatus to be provided in a vehicle, the vehicle including a front wheel and a rear wheel that are disposed in a vehicle longitudinal direction to be partly protruded from a bottom surface of a vehicle body of the vehicle downward in a vertical direction of the vehicle body,
the airflow adjusting apparatus comprising:
a first airflow generator provided on the bottom surface of the vehicle body and behind the front wheel, and configured to generate a first airflow moving backward of the vehicle;
a second airflow generator provided on the bottom surface of the vehicle body and behind the first airflow generator, and configured to generate a second airflow that deflects, vehicle-widthwise inward, an airflow flowing in from a side on which the first airflow generator is disposed; and
a third airflow generator provided between the second airflow generator and the rear wheel and configured to generate a third airflow having a speed component along a vehicle widthwise direction.

20. The airflow adjusting apparatus according to claim 19, wherein
the first airflow generator, the second airflow generator, or both include a plasma actuator including:
at least one pair of electrodes disposed with a dielectric in between; and
a power supply configured to apply a voltage to the at least one pair of the electrodes.

* * * * *